US006718377B1

United States Patent
Bischoff et al.

(10) Patent No.: US 6,718,377 B1
(45) Date of Patent: Apr. 6, 2004

(54) TELECOMMUNICATIONS NETWORK MANAGEMENT SYSTEM INTERFACE

(75) Inventors: Timothy W. Bischoff, Dublin, OH (US); Mark Vincent O'Riordan, Gahanna, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/526,011

(22) Filed: Mar. 15, 2000

Related U.S. Application Data
(60) Provisional application No. 60/148,770, filed on Aug. 13, 1999.

(51) Int. Cl.⁷ ............................................. G06F 15/173
(52) U.S. Cl. ................. 709/223; 709/203; 709/220; 709/315; 709/318; 707/103 Y; 379/230
(58) Field of Search ................................. 709/203, 220, 709/223, 315, 318; 707/103; 379/230

(56) References Cited

U.S. PATENT DOCUMENTS

| | | | | |
|---|---|---|---|---|
| 5,983,233 A | * | 11/1999 | Potonniee | 707/103 R |
| 6,182,155 B1 | * | 1/2001 | Cheng et al. | 709/315 |
| 6,182,157 B1 | * | 1/2001 | Schlener et al. | 709/318 |
| 6,222,533 B1 | * | 4/2001 | Notani et al. | 345/733 |
| 6,243,746 B1 | * | 6/2001 | Sondur et al. | 709/220 |
| 6,260,062 B1 | * | 7/2001 | Davis et al. | 709/223 |
| 6,336,118 B1 | * | 1/2002 | Hammond | 707/103 Y |
| 6,363,421 B2 | * | 3/2002 | Barker et al. | 709/223 |
| 6,434,598 B1 | * | 8/2002 | Gish | 709/203 |
| 6,512,824 B1 | * | 1/2003 | Hsieh et al. | 379/230 |

OTHER PUBLICATIONS

Raymond P. Canuso, Power Programming In HP Openview: developing CMIS applications, 1996, Prentice Hall PTR, summary, copy right 1997.*

* cited by examiner

*Primary Examiner*—Kenneth R. Coulter
*Assistant Examiner*—Hai V. Nguyen

(57) ABSTRACT

A network includes an operations support system (20) for managing one or more network elements (40), and an interface (10) between the operations support system (20) and each network element (40). The interface (10) includes a network element side mediator object (14) and a corresponding operations support side proxy mediator object (14p). During initialization of the interface (10), method calls from the proxy mediator object (14p) to the mediator object (14) are employed by the operations support system (20) to obtain a list of data tables supported by the network element (40). The interface (10) also includes a network element side interface object (12) and a corresponding operations support system side proxy interface object (12p). In this case, during initialization of the interface (10), method calls from the proxy interface object (12p) to the interface object (12) are employed by the operations support system (20) to obtain a list of attributes for each data table listed. Preferably, the data tables passed across the interface (10) are carried in one of a finite number of distinct well defined containers, each container carrying data tables having a set of common characteristics. In this manner, a standarized extensible interface (10) is achieved.

18 Claims, 4 Drawing Sheets

TELECOMMUNICATIONS NETWORK MANAGEMENT SYSTEM INTERFACE

This application claims the benefit of U.S. Provisional Application No. 60/148,770, filed Aug. 13, 1999, which is incorporated herein by reference.

BACKGROUND OF THE INVENTION

The present invention relates to the art of support systems. It finds particular application in conjunction with system interfaces between, for example, an operations support system and an element management system in a telecommunications network, and will be described with particular reference thereto. However, it is to be appreciated that the present invention is also amenable to other like applications and/or other types of networks.

Typically, in telecommunication networks as well as other network environments, users desire the ability to efficiently and effectively manage (i.e., monitor, regulate, configure, etc.) a network element (NE), e.g., a telecommunications switch or other like devices. Often, an operations support system (OSS), such as a network management system, is employed to manage any number of NEs. Generally, the OSS is made up of the software and the corresponding hardware that controls, monitors, manages, maintains, and performs the functions that keep the network operating efficiently.

At times, an element management system (EMS) is employed in connection with the management or administration of one or more NEs. The EMS is generally a system that sits in front of an NE primarily for the purpose of interfacing the NEs to other network components. For example, consider an NE that has a particular function. In the case of a telecommunications switch, the main function is to switch calls. If other systems or network components want to interface with it (e.g., to get billing data from the switch, or to put controls on the switch so it drops certain calls to a particular called number that is currently too busy to handle additional calls, etc.), the EMS sits in front of the NE in order to handle the interactions with the external network components or systems. These interactions are typically incidental or secondary to the main function of the NE, in this case, switching calls. In this manner, the OSS typically interfaces with one or more EMSs to support the network and manage the NEs. Alternately, the OSS interfaces directly with the NE. In this case, the EMS may be represented by the NE itself.

Regardless of whether the OSS accesses the NE through an interface with the EMS or it interfaces directly with the NE, the prior developed interfaces for accomplishing this task have certain drawbacks. Often, these previously developed interfaces are very network element specific. Different NE and/or EMS vendors may or may not follow any kind of standard. They tend to have different ways to obtain data, issue commands or controls and different representations of the same type of data. There is not much uniformity in support systems interfaces and it's generally not the network element's main function so they may or may not have made it very easy to interface with them. Accordingly, the OSS has to be developed with multiple custom interfaces, and a large amount of time is spent on developing the interfaces to try to meet or be compatible with the custom or non-standard NE or EMS data models.

Consequently, across a network, there may multiple types of interfaces to network elements supporting different views of data. Not only does it take a substantial amount of resources to develop and accommodate the many different interfaces, if a change is made on the NE or EMS side, it is a peer to peer change that requires a change on the OSS side. For example, if a new functionality is added to the NE or EMS, then on the OSS side new code has to be written to support the new functionality or mechanism that has been provided.

The present invention contemplates a new and improved interface which overcomes the above-referenced problems and others.

SUMMARY OF THE INVENTION

In accordance with one aspect of the present invention, a network is provided. It includes an operations support system for managing one or more network elements, and an interface between the operations support system and each network element. The interface includes a network element side mediator object and a corresponding operations support side proxy mediator object. During initialization of the interface, method calls from the proxy mediator object to the mediator object are employed by the operations support system to obtain a list of data tables supported by the network element. The interface also includes a network element side interface object and a corresponding operations support system side proxy interface object. In this case, during initialization of the interface, method calls from the proxy interface object to the interface object are employed by the operations support system to obtain a list of attributes for each data table supported.

In accordance with another aspect of the present invention, an interface is provided in a network having an operations support system for managing one or more network elements. The interface exists between the operations support system and each network element. It includes a network element side mediator object and a corresponding operations support side proxy mediator object, wherein during initialization of the interface, method calls from the proxy mediator object to the mediator object are employed by the operations support system to obtain a list of data tables supported by the network element. The interface also includes a network element side interface object and a corresponding operations support system side proxy interface object, wherein during initialization of the interface, method calls from the proxy interface object to the interface object are employed by the operations support system to obtain a list of attributes for each data table supported.

In accordance with another aspect of the present invention, a method of interfacing an operations support system with network elements managed thereby is provided in a network. The method includes defining a number of different container objects. Each container object is used with a distinct data type having common characteristics. The method further includes initializing the interface between the operations support system and the network elements. During interface initialization each table description includes an identification of the container object that the data table is associated with. Thereafter, data tables are passed between the operations support system and the network elements in their associated container objects. By encapsulating the table inside of a container object, the table definition can be changed for the various interfaces to network elements without affecting the OSS interface.

One advantage of the present invention is standardized interfacing between operations support systems and network elements that is data model independent.

Another advantage of the present invention is more efficient data handling across the interface.

Yet another advantage of the present invention is the ability to negotiate changes to data models and the network environment or configuration.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
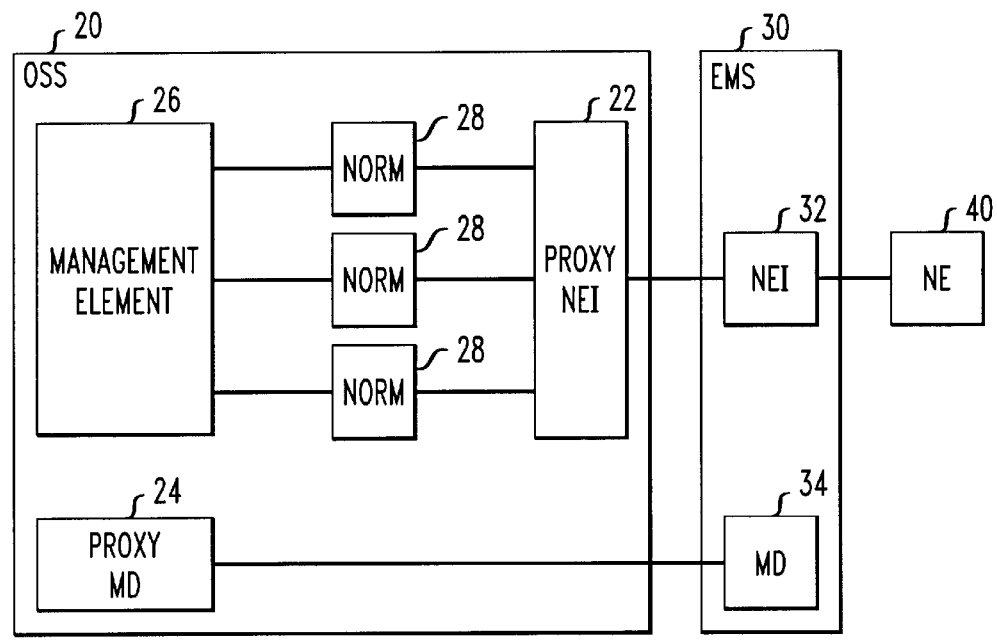
FIG. 1 is a diagrammatic illustration showing a network architecture in accordance with aspects of the present invention.
Figure 2:
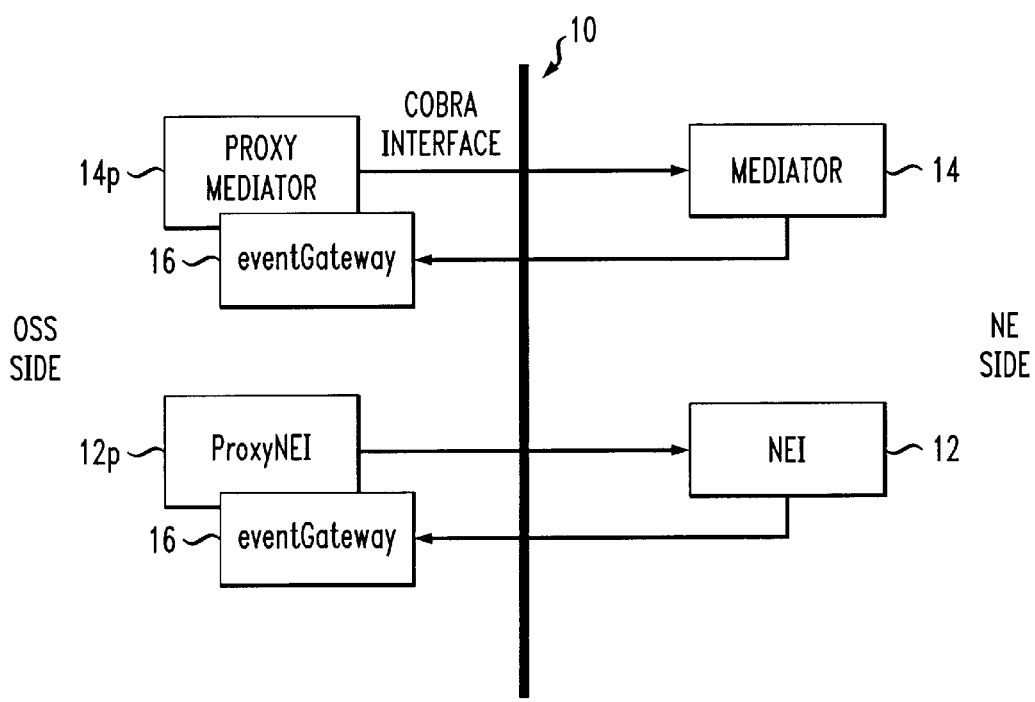
FIG. 2 is a diagrammatic illustration showing the interaction of interface objects in accordance with aspects of the present invention.

With reference to FIGS. 1 and 2, in accordance with a preferred embodiment of the present invention, an interface 10 between an Operations Support System (OSS) 20, such as a Network Management System, and an Element Management System (EMS) 30 is provided. For purposes herein, the interface 10 is primarily considered from an OSS viewpoint, and while the interface objects are described herein, the objects (or tables) specific to the underlying data model are typically defined or agreed upon by the EMS 30 and OSS 20.

Communication with NEs 40 is recognized as a potentially difficult and tedious task for an OSS 20. In an OSS product, NE connectivity is desired, and often, that function is supported within the product. EMSs 30 can address the communication issue by providing NE connectivity to an OSS 20 through protocol transparency. The EMS 30 can handle all of the protocol issues while passing data between the NE 40 and the OSS 20.

Upper-layer communication usually involves a number of functions that have been traditionally implemented as NE-specific interfaces. Interface initialization, retrieval of NE configuration information, retrieval of NE state information, retrieval of NE periodic data, and handling of NE event data are common functions between an OSS and NE, regardless of the particular OSS or NE. However, with previously developed techniques, specialized interfaces, unique to the NE, were used to accommodate these functions. In a preferred embodiment of the present invention, the interface 10 is independent of the particular NE 40, and it addresses all the functional parameters for OSS to NE communication. In this manner, the OSS 20 is able to exchange data with any NE 40 without implementing NE-specific behavior. In addition to commonality in interface functions, defined data models are preferably exploited by the OSS and NE vendors. These data models include descriptions of reference or configuration data, periodic data, event data, and commands.

For purposes of simplicity and clarity herein, the interface 10 is discussed as being implemented between the OSS 20 and the EMS 30. However, the EMS 30 is optionally integrated with or, in fact, the NE 40 itself. Alternately, the EMS 30 is some other like front-end communication device. The interface 10 also supports EMSs 30 that provide connectivity to multiple NEs 40 (see FIG. 3). The interface 10 itself is independent of any EMS normalization function, since the EMS 30 has the role of describing the data model to the OSS 20 during initialization.

The approach described herein allows for data model independence through the use of container objects and data model discovery. The interface 10 classifies all data into a specific category (e.g., reference, periodic, alarm, message, and command) and utilizes a container specific to that category in which to transfer data. Each category also has specific behaviors associated with them, which are implemented in the interface 10. The containers are used to pass the data represented by the underlying network data model. The content of the container objects is described during initialization. A series of interactions take place between the OSS 20 and EMS 30 during which the EMS 30 offers the supported tables to the OSS 20 and makes available the descriptions of those tables. The OSS 20 uses this information to determine how to handle each table of interest, and notifies the EMS 30 of the tables it wishes to exchange.

More specifically, the interface 10 describes three object interfaces: a network element interface (NEI) 12, a mediator 14, and eventGateways 16. The architecture in which these interfaces are employed is depicted in FIG. 1 with the OSS 20, the EMS 30, and the NE 40 preferably being separate computer systems.

The NEI object interface 12 is located (NEI box 32 in FIG. 1) on the EMS 30 and provides an interface between the OSS and the NE. The mediator object 14 (the mediation device (MD) box 34 in FIG. 1) is also located on the EMS 30 and provides a standard interface for the set of network elements that the EMS 30 is supporting. An OSS side Proxy NEI object 12p located in Proxy NEI box 22 invokes operations on the NEI object 12, while an OSS side Proxy mediator 14p located in Proxy MD box 24 invokes operations on the mediator object 14. An eventGateway object 16 is associated with each of the Proxy NEI object 12p and the Proxy mediator object 14p. The NEI object 12 notifies the Proxy NEI object 12p of events by invoking operations on the eventGateway object 16 in the Proxy NEI 22. Likewise, the mediator object 14 notifies the Proxy mediator object 14p of events by invoking operations on the eventGateway object 16 in the Proxy MD 24. The NEI 12, mediator 14, and eventGateway object 16 object interfaces are preferably described in an Interface Definition Language (IDL) that is agreed to by both the OSS and EMS and data transport is provided by Transimission Control Protocol/Internet Protocol (TCP/IP) through a Common Object Request Broker Architecture (CORBA-compliant object request broker). Alternately, other implementations may be employed.

Figure 3:
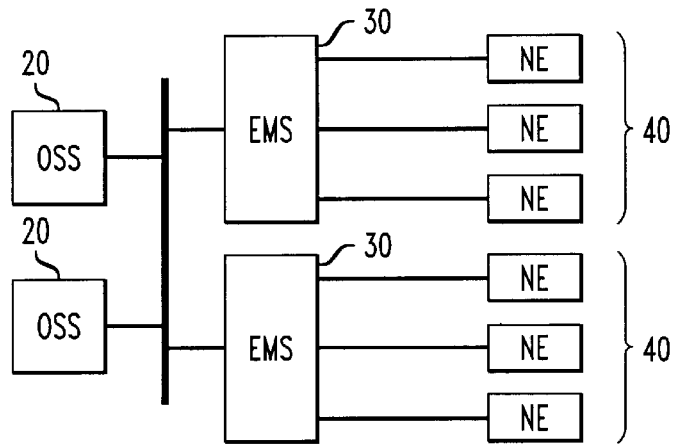
FIG. 3 is a diagrammatic illustration showing a high-level overview of the relationships between an operations support system, element management systems, and network elements in accordance with aspects of the present invention.

With further reference to FIG. 3, preferably, one or more OSS 20 is able to concurrently utilize multiple EMSs 30 with each EMS 30 providing support for a distinct set of NEs 40. The associations between EMSs 30 and NEs 40 are obtained by the OSS 20 from each EMS 30 during interface initialization. In this regard, each EMS 30 is expected to represent one or more NEs 40.

Note FIG. 3 shows multiple OSS 20 being supported. When the interface described is implemented on an EMS 30, the EMS 30 can support data distribution to multiple OSS 20. Each OSS 20 can support a different data representation. This is in part due to the container objects described herein which cover all the types of data exchanges that may take place between an OSS 20 and an NE 40. An advantage of using multiple OSS 20 in this manner is that it limits the number of network connections to the NEs 40. In addition, it arbitrates port contention among multiple OSS 20 when there are a limited number of ports on the NE 40.

In a preferred embodiment, any number of mediator object interfaces 14 can exist (one per EMS 30), each handling a set of NEs 40. The OSS 20 maintains persistent reference data for each EMS 30, describing its name, version, etc., as well as the network location of its EMS MD 34. The network location preferably consists of the IP address of the EMS 30 and the TCP/IP port number of the name service on the EMS 30. Connection to the EMS name service provides a "stringified" Interoperable Object Reference (IOR) (i.e., the CORBA object location) for the EMS mediator object 14.

The sqNEId object is returned as a list of all NEs 40 that are supported by the EMS 30. The list (i.e., sqNEId) is transferred during system start-up as a part of the negotiation to determine which NEs 40 and which data types the EMS 30 supports. The list may contain 0 or more NEs 40. It is also transferred whenever the link between the EMS 30 and the OSS 20 is reset or the list of NEs 40 supported by the EMS 30 changes. The list may contain NEs 40 that are not supported by the OSS 20.

Two of the goals achieved by the interface 10 are the support of current network element specific interactions (collecting periodic, alarm, reference and message data, and issuing commands/controls) and the ability to extend support of these interactions to new data tables without affecting the OSS to EMS interface. In this regard, the interface 10 can be viewed as providing a set of containers in which data objects or NE objects can be carried or passed between the EMS 30 and the OSS 20.

The nePeriodic object is the container object that passes the periodic data to the OSS 20. For every interval, the EMS 30 passes an neperiodic object for each of the data tables supported by each of the NEs 40, as identified during initialization.

The neControl object is used to transmit command/control requests from the OSS 20 to the EMS 30. It is also used by the EMS 30 to transmit command/control responses from the NE 40. The object supports transmitting either a single request and one or more responses. Multiple responses are possible from an NE 40 when a control audit has been performed.

The neReference object passes reference data between the OSS 20 and the EMS 30. The neReference object contains the reference data for a single table type. When a reference audit on the NE 40 has been performed, the EMS 30 passes an neReference object to the OSS 20 containing the results of the audit.

The neMessage object is used to transfer messages from the network element, in bulk, between the OSS 20 and the EMS 30. The messages are expected to be essentially raw data messages as received from an NE 40.

The neAlarm object passes alarm information from the EMS 30 to the OSS 20. Preferably, alarms are generated by the EMS 30 for two reasons: a problem is reported by the NE 40 or a problem is detected with data collection such as a failed connection with the NE 40. The EMS 30 passes an neAlarm object when the condition is first detected or reported by the NE 40 with an alarm state of on. When the condition is no longer present or reported by the NE 40, the EMS 30 passes an neAlarm object with the alarm state set to off.

The rawData object passes the status of data collection for each type of raw data received by the EMS 30 from the NE. For example, if the NE 40 transfers the periodic data as two files, each file has a separate rawName. If problems with data collection are detected, this is indicated in a statusFlags attribute. This object is used to debug problems with data collection. Separate rawData objects are created when command/control responses are received from the NE 40 or when an alarm is received from the NE 40.

The interface 10 describes the handling of the containers, but does not explicitly describe the container contents. Instead, "configuration data" is used to pass NE object details between the EMS 30 and the OSS 20. The configuration data is provided in two object types, each describing a different aspect of the NE objects. Configuration data is provided to describe the list of data objects or tables supported by each NE 40 and to describe the attributes of each of these data objects or tables.

The list of tables is referred to as the strcNEData object and describes each data table that can be transferred between the EMS 30 and the OSS 20 for each NE 40 supported. The list of table names (i.e., sqDataTypes) is transferred during initialization and is negotiated between the OSS 20 and the EMS 30. The list of table names supported for a specific NE 40 is stored on the EMS 30. This list can vary from one NE 40 to another based on the generic and type. This object describes the general aspects of the table that is going to be exchanged. Examples of attributes of the strcNEData object are:

a name of the data table;

a type of the table—indicating that the table describes periodic, reference, control, or alarm data (i.e., the container associated with the table);

a version identifier to track changes in the data model supported on the EMS 30;

a maximum time for which a request for an object is considered valid (i.e., the request for data timeout);

a maximum time for which to wait for audit results;

a maximum number of records to be sent from the EMS 30 to the OSS 20, for each request;

a duration of a period (applicable only to periodic objects) to differentiate between objects of the same name but for different accumulation durations;

a variant identifier to indicate that the table is to be used exactly the same way as a table for a different NE 40 with the same table name and variant identifier;

a flag indicating that the NE 40 can be audited to obtain the data for this table (this only applies to reference and control data);

a flag indicating whether or not associated reference data is required for this object;

two threshold values (one for low severity, one for high severity) which are used in determining the number of "missed" periods of data that are allowed for an object before the OSS 20 generates a warning; and, a count of attributes in the table.

For a given table, the interface 10 provides a mechanism to obtain the list of attributes in the table. The attrList structure is returned to the OSS 20 to describe the data table requested. This object establishes the attributes that are supported by the NE 40. Since this object is exchanged for each NE 40, the list of attributes could be different based on the generic or type of NE 40. For example, the list could describe 10 attributes for one NE 40 and 25 attributes for another NE 40. This list only describes the attributes that are going to be transferred. Attributes that are not going to be transferred may not be included. Examples of attributes of the attrList object are:

a name of the;

an "isvalid" flag that indicates whether or not the attribute will contain valid data (e.g., while the attribute is always a part of the object, it may or may not contain valid data);

a low-level data type (e.g., string, integer, boolean, float);

an "isKey" flag indicating whether or not this attribute is part of the data table key;

a flag indicating whether this attribute is populated by an NE audit; and, an alternative label for the attribute.

Figure 4:
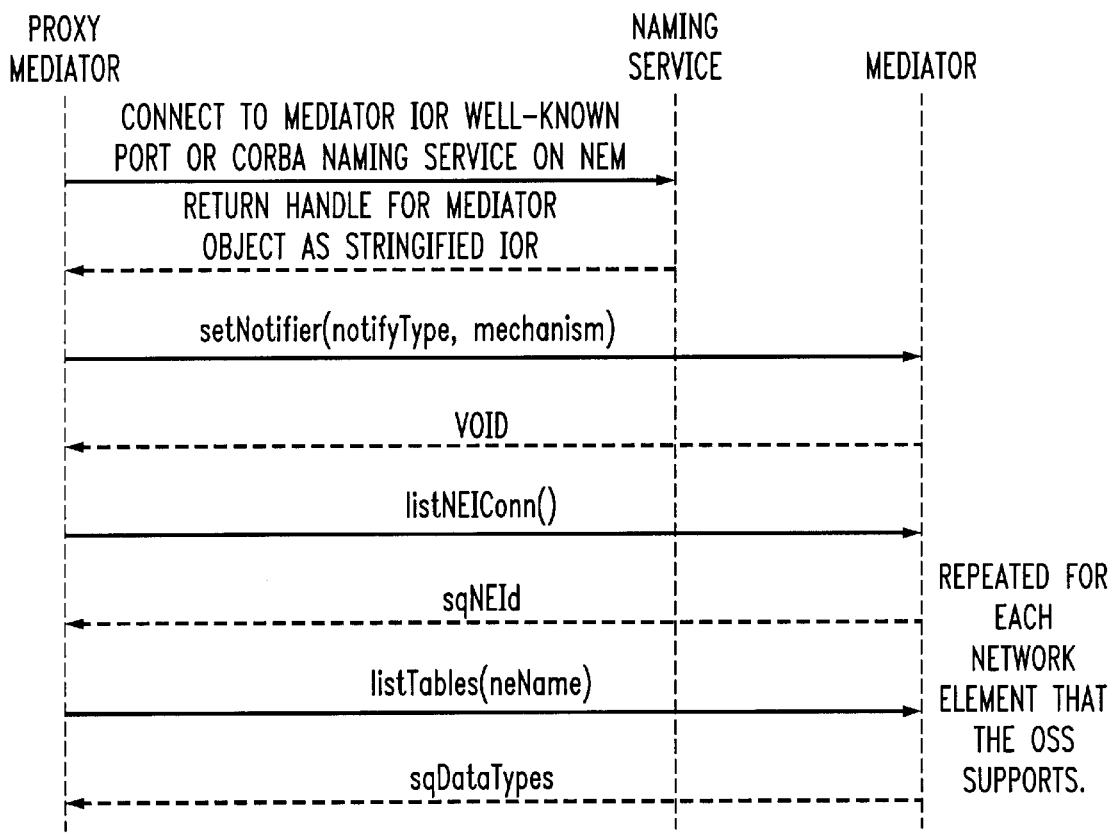
FIG. 4 is a diagrammatic illustration showing an event trace of a mediator object initialization in accordance with aspects of the present invention.
Figure 5:
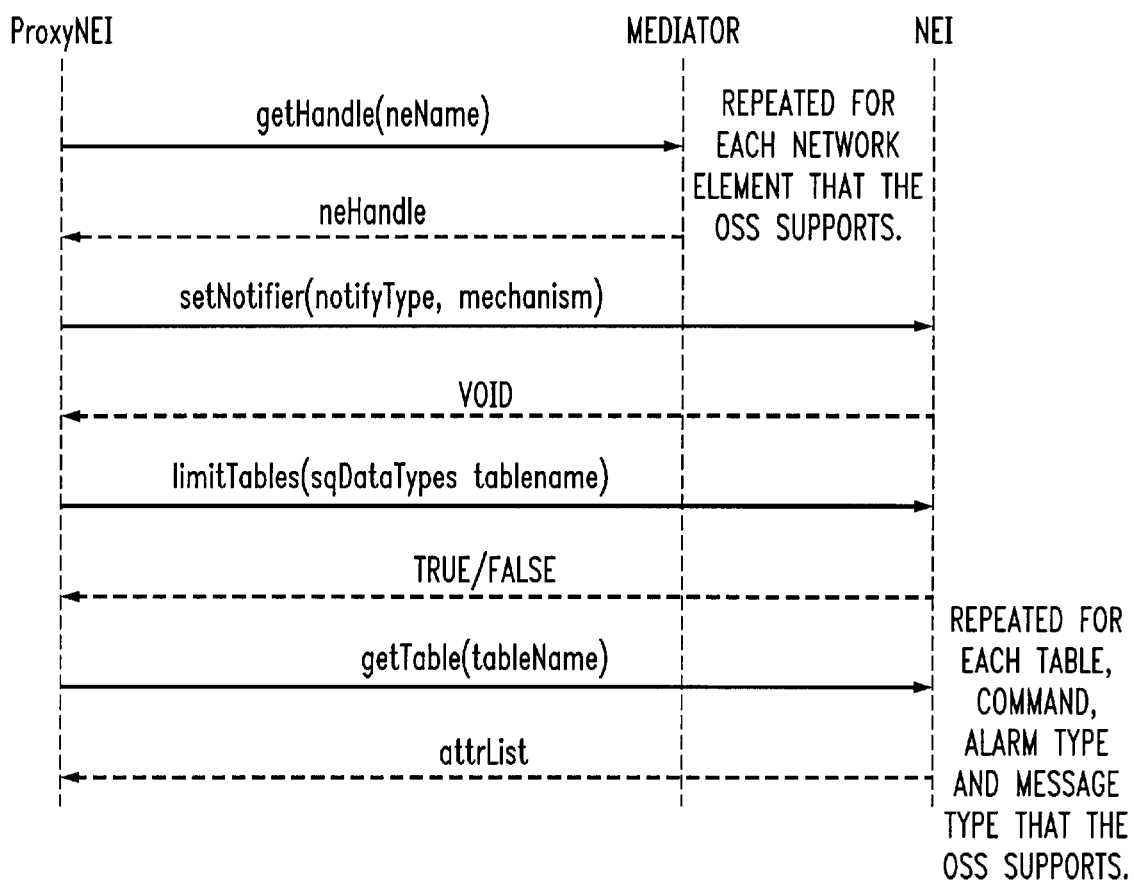
FIG. 5 is a diagrammatic illustration showing an event trace of a network element interface object initialization in accordance with aspects of the present invention; and, FIG. 6 is a diagrammatic illustration showing an event trace of periodic data processing in accordance with aspects of the present invention.

With further reference to FIGS. 4 and 5, a number of steps are needed to initialize the interface 10 between the OSS 20 and the EMS 30. With particular reference to FIG. 4, the mediator interface initialization is depicted as an event trace, where solid arrows indicate invoking methods or operations and dashed arrows indicate the operation results. The following steps are used to initialize communication with the mediator object 14 on an EMS 30:

1. Locate the Mediator Object

The OSS 20 uses a name service to obtain the object handle (i.e., IOR) of the mediator object 14 on the EMS 30. Upon connecting to the name service port, the "stringified" IOR of the mediator interface is returned 14.

2. Specify the Event Destination for miscEvent Objects

A setNotifier( ) method on the mediator object 14 is used by the OSS 20 to indicate whether events should be sent using the CORBA event service, or sent by method invocation on an OSS object. In the case of method invocation, the "stringified" IOR of the OSS eventGateway object 16 (i.e., associated with the Proxy MD 24) is passed as a parameter of the setNotifier( ) method.

3. Obtain List of Supported Network Elements

The OSS 20 invokes the listNEIConn( ) method on the mediator object 14 to obtain the list of NEs (sqNEId) 40 that are supported by the EMS 30. For each NE 40, the list preferably includes the NE name, its type, its release identifier, a physical link status, and an activation status.

4. Obtain List of Supported Tables for each Network Element

For each NE 40, the OSS 20 invokes the listTables( ) method on the mediator object 14 to obtain the list of data tables (sqDataTypes) supported by the NE 40.

Once the mediator object initialization has been performed, the NEI objects 12 can be initialized. The same steps are followed for each NE 40 that is to be supported by the OSS 20. With particular reference to FIG. 5, the NEI object initialization is depicted as an event trace, where solid arrows indicate invoking methods or operations and dashed arrows indicate the operation results. The following steps are used to initialize communication with the NEI objects 12 on an EMS 30:

1. Locate the NEI

Each management element 26 on the OSS 20 (see FIG. 1) communicates with its companion NEI object 12 on the EMS 30. The management element 26 is a point of access to the relevant data obtained by the OSS 20. In any event, the gethandle( ) method on the mediator object 14 is invoked to obtain a "stringified" IOR for a specific NEI object 12.

2. Specify the Event Destination for Network Element Events

The setNotifier( ) method on the NEI object 12 is used by the OSS 20 to indicate whether events should be sent using the CORBA event service, or sent by method invocation on an OSS object. In the case of method invocation, the "stringified" IOR of the OSS Proxy NEI object 12p is passed as a parameter of the setNotifier( ) method. The events affected by this invocation are the neAlarm object and dataRequest object (described below).

3. Negotiate List of Supported Tables

Since the OSS 20 may not provide support for all of the data tables available for a specific NE 40, it sends its list of supported tables (sqDataTypes) back to the EMS 30. For example, the EMS 30 may indicate that it is capable of providing multiple versions of a table, while the OSS 20 is configured to handle only the one version of the table. The list of tables obtained by the listTables( ) method is modified by removing the tables that the OSS 20 will not support. This list is sent to the appropriate NEI object 12 as a parameter of the limitTables( ) method on the NEI object 12.

4. Obtain List of Attributes for each Table

For each data table that is to be supported by the OSS 20 for a particular NE 40, the list of the table's attributes (attrList) is obtained by the invoking the getTable( ) method on the NEI object 12. One of its primary uses is to create and interpret data structures that are passed between the OSS 20 and the EMS 30. This data is passed to each relevant Management Element 26 on the OSS 20.

5. Send Reference Data for Network Element

For each reference data table supported by the NE 40, the OSS 20 sends the current reference data to the EMS 30. An entry is present in the reference table for each item that the OSS expects periodic data for. The OSS 20 creates a neReference structure and passes it to the appropriate NEI object 12 on the EMS 30 by invoking the refupdate( ) method on the NEI object 12.

6. Activate the NEI

When the OSS 20 is ready to accept data for a particular NE 40, it invokes the activate( ) method on the appropriate NEI object 12. Until the NEI object 12 is activated, no periodic data or NE alarms will be generated for the NE 40.

In a preferred embodiment, additional support is provided to handle general interface administration. This includes:

Miscellaneous Notification

Preferably, a general-purpose event mechanism is provided to handle events that are not related to data availability (or data requests) or alarms. An example is the indication from the EMS 30 that the connectivity status of an NE 40 has changed, or that an NE 40 has been added to the EMS 30. A miscEvent is sent by the EMS 30 indicating the event source (EMS, NEI, NE), the source name, the event type, and the event data.

Deactivation of an NEI

Should deactivation of the connection to an NE 40 be desired, the deactivate( ) method is called on the NEI object 12 to deactivate a specific NE 40. This is the recommended action to take before shutting down the entire interface 10.

Orderly Shutdown of the Interface

Since data transactions may be taking place at any time, a request to shutdown the interface 10 should be done as cleanly as possible. Preferably, a bye( ) method on the NEI object 12 is used to notify the EMS 30 that the OSS 20 is taking down its connection to that NEI object 12. The EMS 30 should no longer consider the eventGateway handle associated with that NEI object 12 to be valid. Accordingly, the OSS 20 will request a new handle for the associated NEI object 12 before attempting communication again.

The OSS 20 uses the bye( ) method on the mediator object 14 to indicate that it is no longer going to collect data from the EMS 30. The EMS 30 then considers the handle to the eventGateway handle associated with the mediator object 14 to be invalid. The OSS 20 does not attempt communication with the mediator object 14 until it gets a new handle through the EMS-provided name service.

"Disorderly" Shutdown of the Interface

The EMS mediator and NEI objects, 14 and 12, respectively, preferably have methods, ruok( ), which are used to determine whether or not the interface 10 is still "alive". If a CORBA data communication failure occurs, or if the OSS 20 has not received a response from the EMS 30 in a reasonable period of time, the OSS 20 makes an attempt to see if the EMS 30 is still operating correctly. If an the EMS NEI object 12 cannot be contacted, but the EMS mediator object 14 is still operating, the OSS 20 will attempt to reinitialize the connection to the NEI object 12, going through all the steps associated with initializing an NEI connection. If the EMS mediator object 14 cannot be contacted, the OSS 20 attempts to reinitialize all connections to the EMS 30, starting with the determination of the location of the EMS mediator object 14.

Since any reinitialization may ultimately result in the loss of some data, the OSS 20 makes all reasonable attempts at contacting the EMS objects before it initiates any "restarts". Since data may also be lost during the "waiting", the OSS 20 will not wait for many periods to elapse before initiating the "restart". The actual strategy used is driven by the product parameters.

In addition to the unsolicited reference update, the EMS 30 may request reference data from the OSS by issuing a dataRequest event from the appropriate NEI object 12. This event indicates the NE 40, the desired table, and an action of "Request". Upon receipt of this event, the OSS 20 invokes the refUpdate( ) method on the NEI object 12 which issued the event, sending the complete set of reference data for the desired table.

Figure 6:
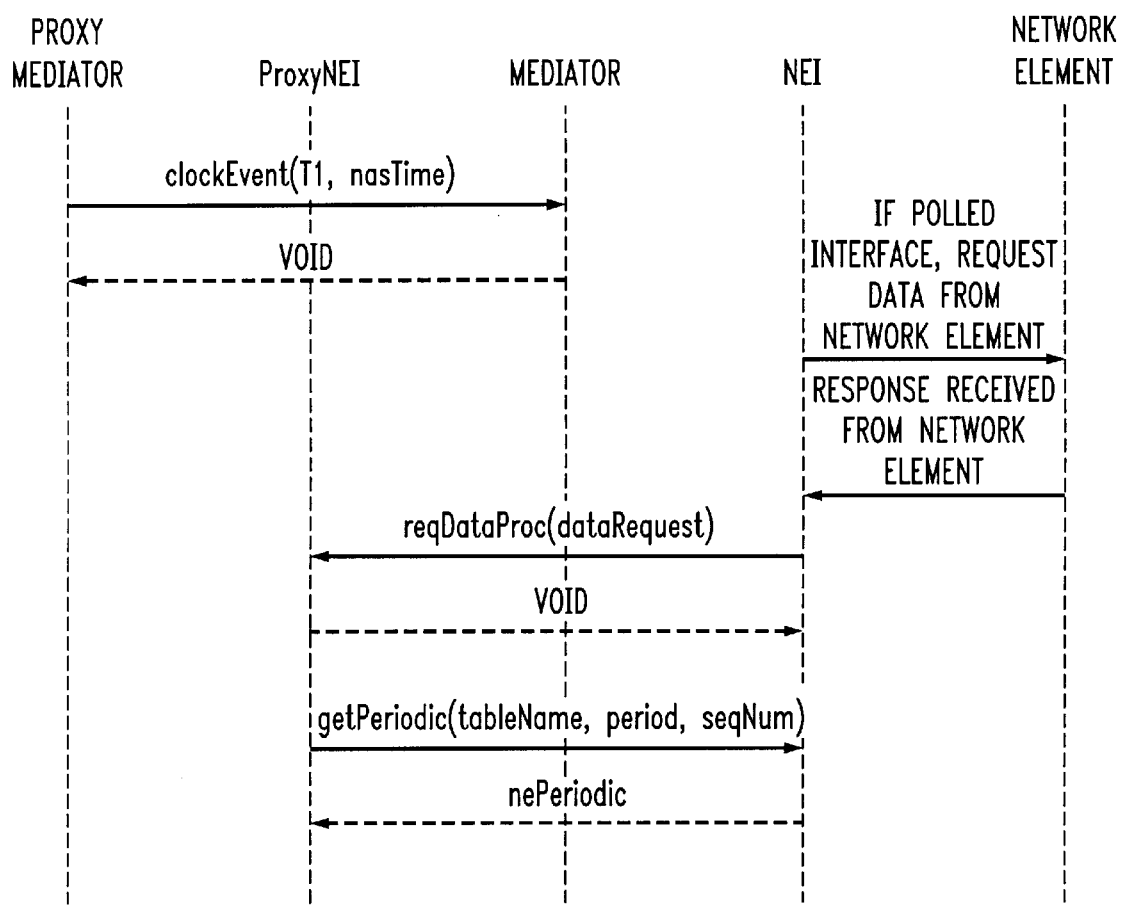

With further reference to FIG. 6, the processing of periodic data is depicted as an event trace, where solid arrows indicate invoking methods or operations and dashed arrows indicate the operation results. Periodic data is collected relative to a clock event provided by the OSS 20. The EMS's mediator object 14 includes a method to receive clock events, such as the OSS "Tl" event. Upon receipt of the clock event, the EMS 30 initiates-data collection for all periodic objects relevant to the current periodOnce periodic data has been collected and normalized by the EMS 30 for a particular NE 40, the associated NEI object 12 issues a dataRequest event (with transType set to "Available") indicating availability of the periodic data. Upon receipt of this event, the OSS 20 invokes the getperiodic( ) method on the appropriate NEI object 12, which will return the neperiodic structure.

With regard to alarm processing, upon reception of an NE alarm, the EMS 30 sends the OSS 20 the alarm as an event using the neAlarm structure.

With regard to control or command implementation processing, controls/commands are sent between the OSS 20 and the EMS 30 in neControl structures. The neControl structure can also be used to send results from the EMS 30 to the OSS 20. A control transfer type attribute (xferType) is used to identify the type of response.

The OSS 20 assigns a serial number before it is sent to the EMS 30. This serial number is used to track and identify the control/command response. The OSS 20 invokes the issuectl( ) method on the EMS NEI object 12, passing the neControl. The EMS 30 will accept the request unless controls/commands are not permitted. If the control/command request cannot be correctly mapped to for a network element, the OSS 20 will receive the reason in a separate ctlEvent notification. If the request can be mapped, the EMS 30 will attempt to issue the request on the appropriate NE 40.

Once the NE 40 responds to request, the EMS 30 formulates a neControl object to return the results to the OSS 20. The appropriate EMS NEI object 12 issues a controlEvent by invoking the ctlNotify( ) method on the eventGateway object 16 that corresponds to the NE 40. Once the OSS 20 receives the notification, it invokes the getctl( ) method on the EMS NEI object 12 to retrieve the network element response.

With regard to reference audit processing, the OSS 20 can request an audit of reference data for a particular NE 40 by invoking the auditRef( ) method on the corresponding EMS NEI object 12. The OSS 20 requests audits of specific reference data tables, which have been previously identified by their "isAuditable" attribute in the supported object list.

Upon receiving the audit request from the OSS 20, the EMS obtains the data from the NE 40. It uses the NE data to populate a neReference structure, and invokes the reqDataProc( ) method on the OSS eventGateway object 16 which handles the particular NE 40. The "tableAction" attribute of the dataRequest structure is set to "Available" to indicate that the reference data object is available from the EMS 30.

The OSS 20 invokes the getReference( ) method on the appropriate EMS NEI objects 12 to obtain the reference audit results.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A network comprising:
  an operations support system for managing one or more network elements; and,
  an interface between the operations support system and each network element, said interface including:
    a network element side mediator object and a corresponding operations support side proxy mediator object, wherein during initialization of the interface, method calls from the proxy mediator object to the mediator object are employed by the operations support system to obtain a list of data tables supported by the network element; and,
    a network element side interface object and a corresponding operations support system side proxy interface object, wherein during initialization of the interface, method calls from the proxy interface object to the interface object are employed by the operations support system to obtain a list of attributes for each data table listed.

2. The network according to claim 1, wherein the network is a communications network.

3. The network according to claim 2, wherein at least one of the network elements is a communications device.

4. The network according to claim 1, said network further comprising:
an element management system residing between the operations support system and one or more of the network elements such that the interface is between the operations support system and the element management system, said element management system incorporating the mediator object and a number of corresponding interface objects for each network element associated with the element management system.

5. The network according to claim 4, wherein during initialization of the interface, method calls from the proxy interface object to the mediator object are employed by the operations support system to obtain a list of the network elements associated with the element management system.

6. The network according to claim 1, wherein the proxy mediation object and each proxy interface object have an associated event gateway object through which the proxy mediation and interface objects, respectively, are notified of events from their corresponding mediation and interface objects.

7. The network according to claim 1, wherein the data tables supported by each network element are dynamically described via acquisition of the list of data tables and each data table's list of attributes.

8. The network according to claim 1, wherein for at least one network element, the mediator object and network element's associated interface object are incorporated in the network element.

9. The network according to claim 1, wherein data tables passed across the interface are carried in one of a finite number of distinct well defined containers, each container carrying data tables having a set of common characteristics.

10. The network according to claim 9, wherein the containers have predetermined handling instructions associated therewith.

11. The network according to claim 9, wherein the list of data tables includes an identification of which container type each data table is carried in.

12. In a network having an operations support system for managing one or more network elements, an interface between the operations support system and each network element, said interface including:
a network element side mediator object and a corresponding operations support side proxy mediator object, wherein during initialization of the interface, method calls from the proxy mediator object to the mediator object are employed by the operations support system to obtain a list of data tables supported by the network element; and,
a network element side interface object and a corresponding operations support system side proxy interface object, wherein during initialization of the interface, method calls from the proxy interface object to the interface object are employed by the operations support system to obtain a list of attributes for each data table listed.

13. In a network, a method of interfacing an operations support system with network elements managed thereby, wherein the method comprises the steps of:
(a) defining a number of different container objects, each container object being used with a distinct data type having common characteristics;
(b) initializing the interface between the operations support system and the network elements, said initialization including dynamically describing data tables supported by the network elements, wherein the description includes an identification of the container objects each data table is associated with; and,
(c) passing data tables between the operations support system and the network elements in their associated container objects.

14. The method according to claim 13, wherein step (b) comprises:
communicating to the operations support system a list of network elements;
communicating to the operations support system a list of the data tables supported for each network element listed; and,
communicating to the operations support system a list of the attributes for each of the data tables listed.

15. The method according to claim 14, wherein the list of the data tables supported includes the identification of the container objects each data table is associated with.

16. The method according to claim 14, wherein step (b) further comprises:
determining from the list of data tables supported for each network element, which, if any, are not supported by the operations support system;
creating a modified list by removing from the list of data tables supported for each network element those that are not supported by the operations support system; and,
communicating the modified list back to the network elements.

17. The method according to claim 13, wherein step (b) further comprises:
activating the interface for selected network elements, wherein communications with the operations support system is disabled for those network elements that do not have the interface activated.

18. The method according to claim 13, wherein step (b) further comprises:
populating selected data table supported by the network elements with reference data.

* * * * *